US012380003B2

(12) United States Patent
Gupta et al.

(10) Patent No.: US 12,380,003 B2
(45) Date of Patent: Aug. 5, 2025

(54) USER TRIGGERED VIRTUAL MACHINE CLONING FOR RECOVERY/AVAILABILITY/SCALING

(71) Applicant: Google LLC, Mountain View, CA (US)

(72) Inventors: Diwakar Gupta, Seattle, WA (US); Sirui Sun, Edmonds, WA (US)

(73) Assignee: Google LLC, Mountain View, CA (US)

( * ) Notice: Subject to any disclaimer, the term of this patent is extended or adjusted under 35 U.S.C. 154(b) by 481 days.

(21) Appl. No.: 17/737,305

(22) Filed: May 5, 2022

(65) Prior Publication Data

US 2023/0359533 A1 Nov. 9, 2023

(51) Int. Cl.
*G06F 3/00* (2006.01)
*G06F 9/455* (2018.01)
*G06F 11/14* (2006.01)
*G06F 11/20* (2006.01)

(52) U.S. Cl.
CPC ...... *G06F 11/1484* (2013.01); *G06F 9/45558* (2013.01); *G06F 11/203* (2013.01); *G06F 2009/4557* (2013.01); *G06F 2009/45583* (2013.01); *G06F 2009/45595* (2013.01)

(58) Field of Classification Search
CPC ....................................................... G06F 9/455
See application file for complete search history.

(56) References Cited

U.S. PATENT DOCUMENTS

| 9,146,769 | B1* | 9/2015 | Shankar | H04L 67/10 |
| 9,270,785 | B2* | 2/2016 | Graham | H04L 67/10 |
| 9,286,104 | B1* | 3/2016 | Ghosh | G06F 9/45558 |
| 9,672,054 | B1* | 6/2017 | Gupta | G06F 3/0647 |
| 10,264,064 | B1* | 4/2019 | Dantkale | H04L 67/1095 |
| 10,884,790 | B1 | 1/2021 | Saidi et al. | |
| 11,182,189 | B2* | 11/2021 | Zheng | G06F 9/5088 |
| 2003/0212926 | A1* | 11/2003 | Bhat | H04L 43/06 |
| | | | | 714/43 |
| 2012/0017031 | A1* | 1/2012 | Mashtizadeh | G06F 9/4856 |
| | | | | 711/6 |
| 2012/0221710 | A1* | 8/2012 | Tsirkin | G06F 9/4856 |
| | | | | 709/224 |
| 2014/0298338 | A1* | 10/2014 | Doi | G06F 9/5016 |
| | | | | 718/1 |
| 2015/0261581 | A1* | 9/2015 | Wang | G06F 3/0647 |
| | | | | 711/162 |
| 2015/0296027 | A1* | 10/2015 | Bak | H04L 67/148 |
| | | | | 709/202 |
| 2018/0365044 | A1* | 12/2018 | Movsisyan | H04L 41/40 |

(Continued)

OTHER PUBLICATIONS

Dinuni Fernando, Live Migration Ate My VM: Recovering a Virtual Machine after Failure of Post-Copy Live Migration. (Year: 2019).*

(Continued)

*Primary Examiner* — Lechi Truong
(74) *Attorney, Agent, or Firm* — Lerner David LLP (57) ABSTRACT

Generally disclosed herein is an approach for cloning virtual machines during live migration where one or more new copies of a virtual machine can be created while the original virtual machine continues to run. The new copies can preserve a processing state, memory state, and local storage state. The new copies can also be distinguished from each other and the original by including different attributes for each copy.

16 Claims, 4 Drawing Sheets

(56) References Cited

U.S. PATENT DOCUMENTS

2021/0019195 A1* 1/2021 Aronov ................ G06F 9/4856

OTHER PUBLICATIONS

Michael R. Hines, Post-Copy Live Migration of Virtual Machines. (Year: 2009).*
Nagamani H Shahapurea, Distance and Traffic Based Virtual Machine Migration for Scalability in Cloud Computing. (Year: 2018).*
Cui et al. VMScatter: Migrate Virtual Machines to Many Hosts. Virtual Execution Environments, ACM, 2 Penn Plaza, Suite 701 New York NY 10121-0701 USA, Mar. 16, 2013 (Mar. 16, 2013), pp. 63-72.
Deshpande et al. Traffic-Sensitive Live Migration of Virtual Machines. 2015 15th IEEE/ACM International Symposium on Cluster, Cloud and Grid Computing, IEEE, May 4, 2015 (May 4, 2015), pp. 51-60.
International Search Report and Written Opinion for International Application No. PCT/US2023/014431 dated Jun. 2, 2023. 15 pages.
Lagar-Cavilla et al. SnowFlock: Virtual Machine Cloning as a First-Class Cloud Primitive. ACM Transactions on Computer Systems (TOCS), vol. 29, No. 1, Feb. 1, 2011 (Feb. 1, 2011), pp. 1-45.
Le. A Survey of Live Virtual Machine Migration Techniques. Computer Science Review, Elsevier, Amsterdam, NL, vol. 38, Sep. 11, 2020 (Sep. 11, 2020), pp. 1-18.
Stage et al. Network-Aware Migration Control and Scheduling of Differentiated Virtual Machine Workloads. Software Engineering Challenges of Cloud Computing, 2009. CLOUD '09. ICSE Workshop on, IEEE, Piscataway, NJ, USA, May 23, 2009 (May 23, 2009), pp. 9-14.

* cited by examiner

USER TRIGGERED VIRTUAL MACHINE CLONING FOR RECOVERY/AVAILABILITY/SCALING

BACKGROUND

Live migration is the act of copying an actively running virtual machine from a source host machine to a target host machine, preserving virtual device connectivity and network connections. Performance can be impacted at different stages over the course of the migration. Three typical stages in a migration include a source brownout, blackout, and target brownout. During a source brownout, the virtual machine is still executing on the source while memory states are sent from the source to the target. During blackout, the virtual machine is paused, and all remaining states required to begin running the virtual machine on the target are sent from the source to the target. During a target brownout, the virtual machine executes on the target. The source can be present to provide supporting functionality for the target, but otherwise the migration is complete, and the source virtual machine can be deleted.

During a typical migration, attributes or properties remain unchanged between the source and target, including but not limited to internal and external Internet protocol (IP) addresses, instance metadata, block storage data and volumes, operating system and application state, network settings, network connections. Further, while memory states can be copied during live migration, processing states cannot be copied. Copying a virtual machine with a processing state requires a stop and optional restart.

BRIEF SUMMARY

Generally disclosed herein is an approach for cloning virtual machines during live migration where one or more new copies of a virtual machine can be created while the original virtual machine continues to run. The new copies can preserve a processing state, memory state, and local storage state. The new copies can also be distinguished from each other and the original by including different attributes for each copy.

An aspect of the disclosure provides for a method for creating one or more copies of a virtual machine during live migration. The method includes determining, with one or more processors, a time period to enable copying of a virtual machine during live migration; determining, with the one or more processors, an impact of the live migration on the copying of the virtual machine; determining, with the one or more processors, an amount of copies to be created of the virtual machine; and copying, with the one or more processors, a running instance of the virtual machine based on the determined time period, the impact of the live migration, and the amount of copies.

In an example, determining the impact of the live migration further includes determining at least one of a length of brown-out or black-out time. In another example, copying the running instance of the virtual machine further includes copying the running instance when the length of the brown-out or black-out time period is below an upper bound.

In another example, determining a time period to enable copying further includes monitoring traffic usage. In another example, copying the running instance of the virtual machine further includes copying the running instance when the traffic usage is below a threshold.

In another example, determining the amount of copies to be created further includes determining an amount of memory in a memory cache and a rate of memory copy. In another example, copying the running instance of the virtual machine further includes copying multiple instances of the virtual machine based on the amount of memory in the memory cache and the rate of memory copy.

In another example, the method further includes determining, with the one or more processors, whether both the copy and original virtual machines should be active. In another example, copying a running instance of the virtual machine further includes creating one or more new attributes for the copied virtual machine when both the copy and original virtual machine are to be active.

Another aspect of the disclosure provides for a system including one or more processors; and one or more storage devices coupled to the one or more processors and storing instructions that, when executed by the one or more processors, causes the one or more processors to perform operations for creating one or more copies of a virtual machine during live migration. The operations include determining a time period to enable copying of a virtual machine during live migration; determining an impact of the live migration on the copying of the virtual machine; determining an amount of copies to be created of the virtual machine; and copying a running instance of the virtual machine based on the determined time period, the impact of the live migration, and the amount of copies.

In an example, determining the impact of the live migration further includes determining at least one of a length of brown-out or black-out time. In another example, copying the running instance of the virtual machine further includes copying the running instance when the length of the brown-out or black-out time period is below an upper bound.

In another example, determining a time period to enable copying further includes monitoring traffic usage. In another example, copying the running instance of the virtual machine further includes copying the running instance when the traffic usage is below a threshold.

In another example, determining the amount of copies to be created further includes determining an amount of memory in a memory cache and a rate of memory copy. In another example, copying the running instance of the virtual machine further includes copying multiple instances of the virtual machine based on the amount of memory in the memory cache and the rate of memory copy.

In another example, the operations further include determining whether both the copy and original virtual machines should be active. In another example, copying a running instance of the virtual machine further includes creating one or more new attributes for the copied virtual machine when both the copy and original virtual machine are to be active.

Yet another aspect of the disclosure provides for a non-transitory computer readable medium for storing instructions that, when executed by one or more processors, causes the one or more processors to perform operations for creating one or more copies of a virtual machine during live migration. The operations include determining a time period to enable copying of a virtual machine during live migration; determining an impact of the live migration on the copying of the virtual machine; determining an amount of copies to be created of the virtual machine; and copying a running instance of the virtual machine based on the determined time period, the impact of the live migration, and the amount of copies.

In an example, the operations further include determining whether both the copy and original virtual machines should be active; and copying a running instance of the virtual machine further includes creating one or more new attributes for the copied virtual machine when both the copy and original virtual machine are to be active.

DETAILED DESCRIPTION

Generally disclosed herein is an approach for copying virtual machines during live migration. One or more new copies of a virtual machine can be created while the original virtual machine continues to run. The new copies can preserve a processing state, memory state, and local storage state. The new copies can also be distinguished from each other and the original by including different attributes, such as Internet protocol (IP) address, etc., for each copy. The approach includes copying a running instance of a virtual machine using various application level hooks. Application level hooks include application programming interfaces (APIs) or meta-data entries, as examples. Implicit application level hooks can be used as well based on learning about workloads or timing through workload history.

Since live migration can impact workloads, the various application level hooks allow for deciding when to enable copying. For example, the application level hooks can monitor traffic usage to determine a time when traffic is below a threshold in order to start copying or schedule a future copying.

The various application level hooks further allow for controlling an impact of the live migration on the copying. For example, the application level hooks can consider a rate of memory copy. The application level hooks can monitor an amount of memory in a memory cache to determine when to start copying, when to schedule future copying, or how many copies to create. The various application level hooks also allow for controlling an impact of brownout and/or blackout time. A length of time of the migration and an upper bound on a blackout time period can be controlled based on these factors.

As another example, the application level hooks can determine whether both the copy and original virtual machines should be active or only one of the virtual machines needs to be active. If both virtual machines need to be active, the copy virtual machine can get new attributes to distinguish the two virtual machines, such as but not limited to IP address, persistent disk (PD) size, identity and access management roles, keys, instance-name, or other processing, memory, or local storage states, but if only one virtual machine needs to be active, the attributes can be preserved as is. The various application level hooks can also provide preferences around a time to live (TTL). For example, a TTL can be applied to either the original or new copies. The instances can be copied but then the original and/or a portion of the new copies can be terminated after a period of time or when a predetermined number of copies have been created.

As yet another example, the application level hooks can determine and consider trade-offs between pre and post migration, for instance pre-copy and post-copy and more general trade-offs such as but not limited to processing pause time compared to fetching memory remotely. Trade-offs can differ depending on workload. The various application level hooks further allow for controlling suggested or default options based on a workload or user behavior.

The ability to copy running virtual machines, where a new copy can be created while the original copy continues to run, can be helpful for scaling out applications, for disaster recovery, and for high availability use situations. The new copy can preserve a processing state, memory state, and local storage state while minimizing disruption of the blackout stage.

Figure 1:
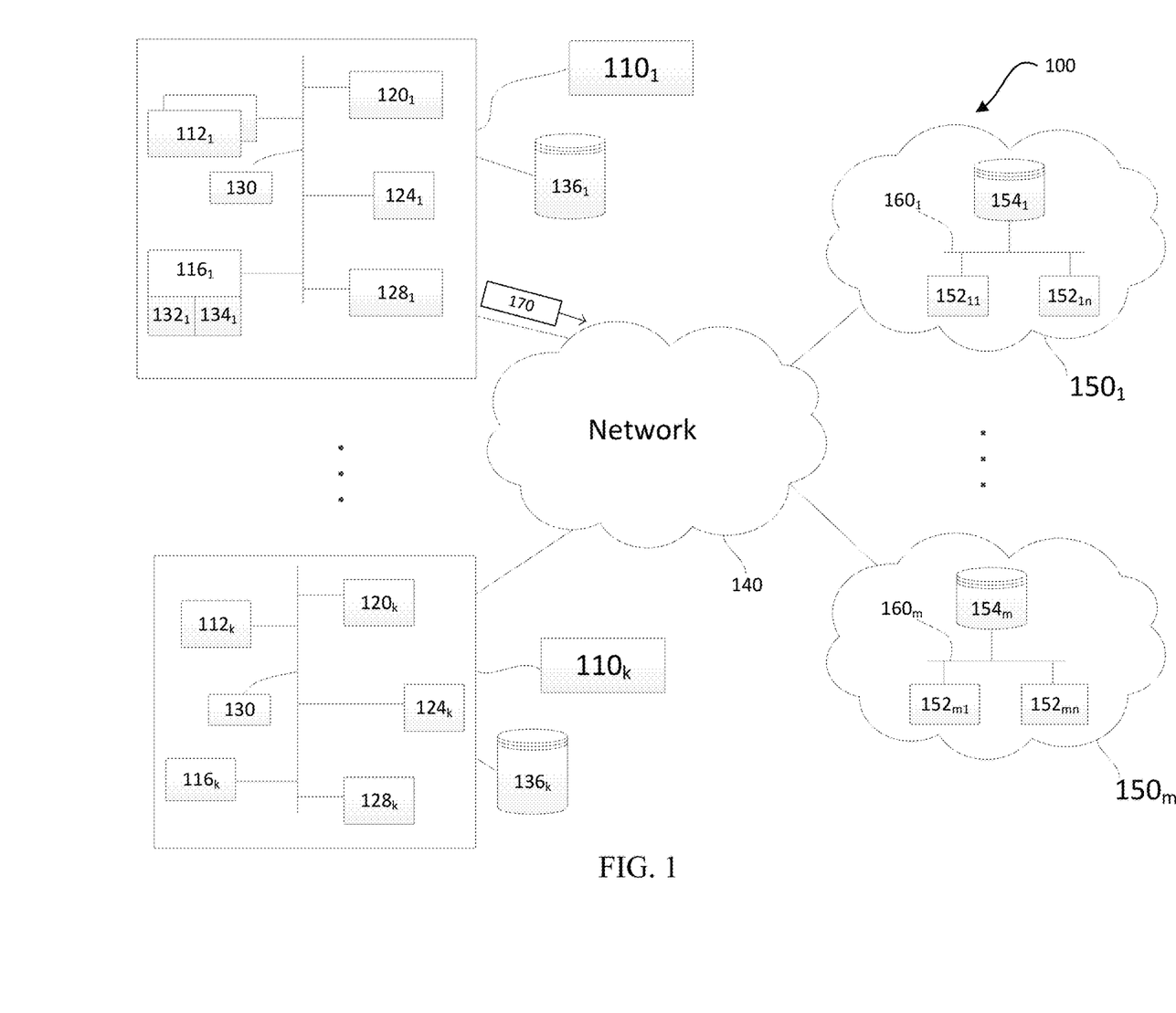
FIG. 1 depicts a block diagram of an example environment for implementing an approach for copying virtual machines during live migration according to aspects of the disclosure.

FIG. 1 depicts a block diagram of an example environment 100 for implementing an approach for copying virtual machines during live migration. The environment 100 includes one or more computing devices 110, which can include computing devices $110_1$ through $110_k$, a network 140, and one or more cloud computing systems 150, which can include cloud computing systems $150_1$ through $150_m$. The computing devices 110 can include computing devices located at user locations that make use of cloud computing services such as Infrastructure as a Service (IaaS), Platform as a Service (PaaS), and/or Software as a Service (SaaS). For example, if a computing device $110_1$ is located at a business enterprise, the computing device $110_1$ can use the cloud systems 150 as a service that provides software applications, e.g., accounting, word processing, inventory tracking, etc. applications, to the computing device $110_1$ used in operating enterprise systems. As an alternative example, the computing devices 110 can lease infrastructure in the form of virtual machines on which software applications are run to support enterprise operations.

Each of the computing devices 110 can include one or more processors 112, memory 116 storing instructions 132 and data 134, a display 120, a communication interface 124, and an input system 128, which are shown as interconnected via an internal network 130. The computing device 110 can also be coupled or connected to a storage 136, which can include local or remote storage, e.g., on a Storage Area Network (SAN), that stores data accumulated as part of a user's operation. The computing device 110 can include a standalone computer (e.g., desktop or laptop) or a server associated with a user. Multiple computing devices 110 can be implemented as servers. Internal network 130 can include data buses or other connections between components internal to a computer. Internal network 130 can also include connections between computing devices, such as a local area network, virtual private network, wide area network, or other types of networks. The memory 116 stores information accessible by the one or more processors 112, including the instructions 132 and data 134 that can be executed or otherwise used by the processors 112. The memory 116 can be of any type capable of storing information accessible by the processors 112, including a computing device-readable medium, or other medium that stores data that may be read with the aid of an electronic device, such as a hard-drive, memory card, ROM, RAM, DVD, or other optical disks, as well as other write-capable and read-only memories. Systems and methods may include different combinations of the foregoing, whereby different portions of the instructions and data are stored on different types of media.

The instructions 132 can be any set of instructions to be executed directly, such as machine code, or indirectly, such as scripts, by the processor 112. For example, the instructions 132 can be stored as computing device code on the computing device-readable medium. In that regard, the terms "instructions" and "programs" may be used interchangeably herein. The instructions 132 may be stored in object code format for direct processing by the processor 112, or in any other computing device language including scripts or collections of independent source code modules that are interpreted on demand or compiled in advance. Processes, functions, methods, and routines of the instructions 132 are explained in more detail below.

The data 134 can be retrieved, stored, or modified by the processor 112 in accordance with the instructions 132. As an example, the data 134 associated with the memory 116 may include data used in supporting services for one or more client devices, applications, etc. Such data may include data to support hosting web-based applications, file share services, communication services, gaming, sharing video or audio files, or any other network based services.

The one or more processors 112 can be any type of processor, including one or more central processing units (CPUs), graphic processing units (GPUs), field programmable gate arrays (FPGAs), and/or application specific integrated circuits (ASICs). Although FIG. 1 functionally illustrates the processor 112, memory 116, and other elements of the computing device 110 as being within a single block, it will be understood by those of ordinary skill in the art that the processor 112, computing device 110, or memory 116 can actually include multiple processors, computing devices, or memories that may or may not be located or stored within the same physical housing. In one example, one or more computing devices 110 can include one or more server computing devices having a plurality of computing devices, e.g., a load balanced server farm, that exchange information with different nodes of a network for the purpose of receiving, processing, and transmitting the data to and from other computing devices as part of user's operation.

Computing device 110 can also include a display 120, such as a monitor having a screen, a touch-screen, a projector, a television, or other device that is operable to display information. The display 120 can further provide a user interface that allows for controlling the computing device 110 and accessing user space applications and/or data associated virtual machines supported in one or more cloud systems 150, e.g., on a host in a cloud system 150. Such control can include using the computing device 110 to cause data to be uploaded through the input system 128 to cloud system 150 for processing, cause accumulation of data on storage 136, or more generally, manage different aspects of the computer device 110. In some examples, computing device 110 can also access an application programming interface that allows the computing device 110 to specify workloads or jobs that run on virtual machines in the cloud as part of IaaS or SaaS. While input system 128 can be used to upload data, e.g., a USB port, the computing device 110 can also include a mouse, keyboard, touchscreen, or microphone that can be used to receive commands and/or data.

Commands or requests 170 can be sent by the computing devices 110 to the cloud computing systems 150 via the network 140. The network 140 can include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and/or from other computing devices, such as modems and wireless interfaces. The computing device 110 interfaces with network 140 through communication interface 124, which can include the hardware, drivers, and software necessary to support a given communications protocol.

The cloud computing systems 150 can include one or more data centers that may be linked via high speed communications or computing networks. A given data center within the cloud computing system 150 can include dedicated space within a building that houses computing systems and their associated components, e.g., storage systems and communication systems. Typically, a data center will include racks of communication equipment, servers/hosts, and disks. The servers/hosts and disks can include physical computing resources that are used to provide virtual computing resources such as virtual machines. To the extent a given cloud computing system includes more than one data center, those data centers may be at different geographic locations within relatively close proximity to each other, chosen to deliver services in a timely and economically efficient manner, as well provide redundancy and maintain high availability. Similarly, different cloud computing systems are typically provided at different geographic locations.

The cloud computing system 150 can be illustrated as including host machines 152, storage 154, and infrastructure 160. Host machines 152, storage 154, and infrastructure 160 can include a data center within a cloud computing system 150. Infrastructure 160 can include one or more switches, physical links, e.g., fiber, and other equipment used to interconnect host machines within a data center with storage 154. Storage 154 can include a disk or other storage device that is partitionable to provide physical or virtual storage to virtual machines running on processing devices within a data center. Storage 154 can be provided as a SAN within the datacenter hosting the virtual machines supported by the storage 154 or in a different data center that does not share a physical location with the virtual machines it supports. One or more hosts or other computer systems within a given data center can be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS, or SaaS to users as a result of requests for services originating at, for example, the computing devices 110.

Figure 2:
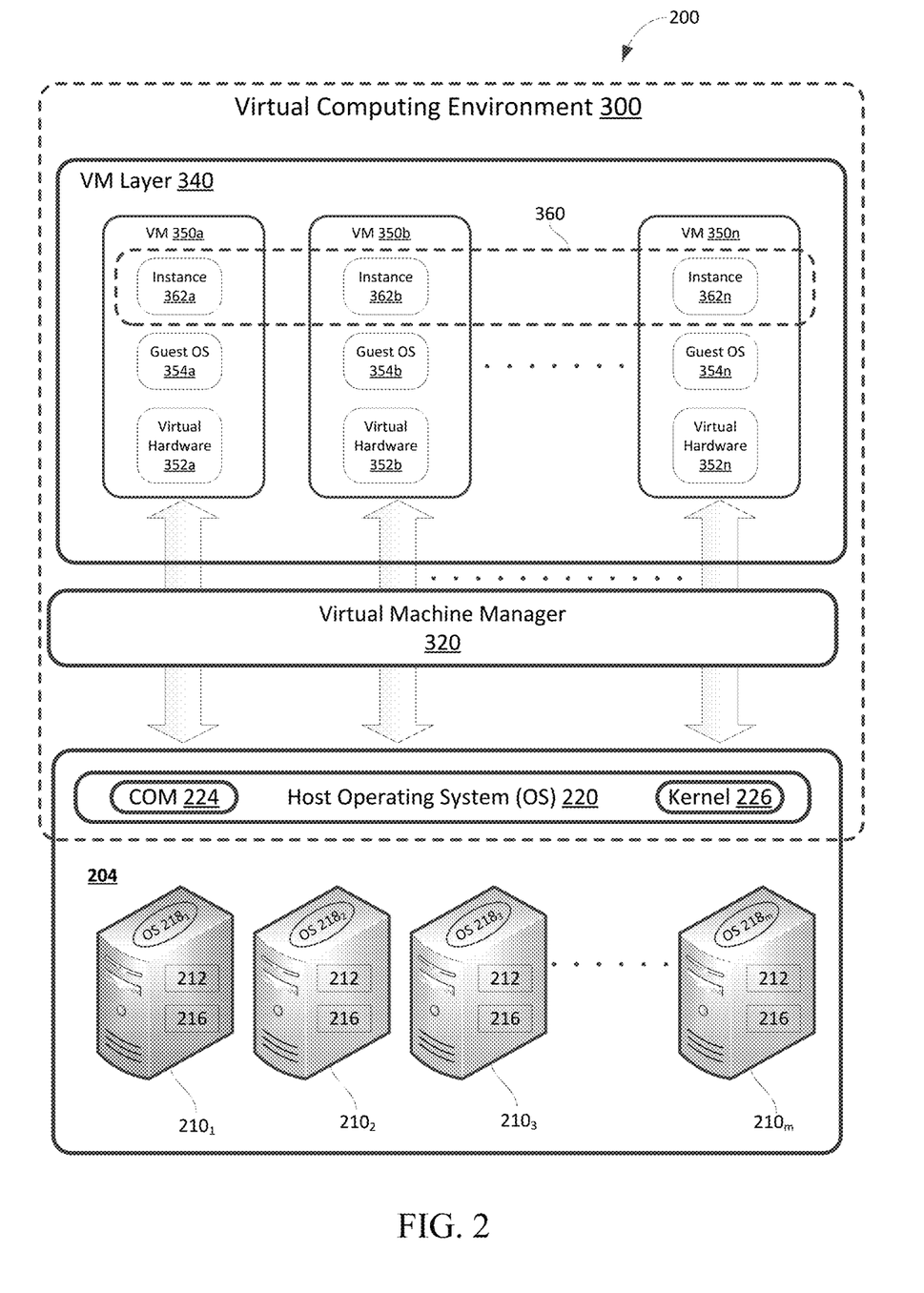
FIG. 2 depicts a block diagram of an example distributed system according to aspects of the disclosure.

FIG. 2 depicts a block diagram of an example distributed system 200, such as that shown in relation to the cloud computing systems 150. The distributed system 200 can include a collection 204 of host machines 210, e.g., hardware resources, supporting or executing a virtual computing environment 300. The host machines 210 can correspond to the host machines 152 of FIG. 1. The virtual computing environment 300 can include a virtual machine manager 320 and a virtual machine layer 340 running one or more virtual machines 350 configured to execute instances 362 of one or more software applications 360.

Each host machine 210 can include one or more physical processors 212, e.g., data processing hardware, and associated physical memory 216, e.g., memory hardware. While each host machine 210 is shown having a single physical processor 212, the host machines 210 can include multiple physical processors 212. The host machines 210 can also include physical memory 216, which may be partitioned by a host operating system (OS) 220 into virtual memory and assigned for use by the virtual machines 350, the virtual machine manager 320, or the host OS 220. Physical memory 216 can include random access memory (RAM) and/or disk storage, including storage 154 accessible via infrastructure 160, as shown in FIG. 1.

The host OS 220 can execute on a given one of the host machines 210 or can be configured to operate across a plurality of the host machines 210. For convenience, FIG. 2 shows the host OS 220 as operating across the plurality of machines $210_1$ through $210_m$. Further, while the host OS 220 is illustrated as being part of the virtual computing environment 300, each host machine 210 is equipped with its own OS 218. However, from the perspective of a virtual environment, the OS on each machine appears as and is managed as a collective OS 220 to the virtual machine manager 320 and the virtual machine layer 340.

In some examples, the virtual machine manager 320 can correspond to a hypervisor, e.g., a compute engine, that includes at least one of software, firmware, or hardware configured to create, instantiate/deploy, and execute the virtual machines 350. A computer associated with the virtual machine manager 320 that executes the one or more virtual machines 350 is typically referred to as a host machine 210, while each virtual machine 350 can be referred to as a guest machine. Here, the virtual machine manager 320 or hypervisor can be configured to provide each virtual machine 350 a corresponding guest OS 354, e.g., 354a-n, having a virtual operating platform and manage execution of the corresponding guest OS 354 on the virtual machine 350.

The virtual machine layer 340 can include one or more virtual machines 350. The distributed system 200 can enable a user to launch the virtual machines 350 on demand by sending a command or request 170 from the computing devices 110 to the cloud computing system 150 via the network 140. For example, the command or request 170 can include an image or snapshot associated with the corresponding OS 220 and the distributed system 200 can use the image or snapshot to create a root resource 210 for the corresponding virtual machine 350. The image or snapshot within the command/request 170 can include a boot loader, the corresponding host OS 220, and a root file system. In response to receiving the command/request 170, the distributed system 200 may instantiate the corresponding virtual machine 350 and automatically start the virtual machine 350 upon instantiation.

A virtual machine 350 emulates a physical computer system, e.g., host machine 210, and operates based on the computer architecture and functions of the physical computer system or a hypothetical physical computer system involving specialized hardware, software, or a combination thereof. In some examples, the distributed system 200 authorizes and authenticates the computing devices 110 before launching the one or more virtual machines 350. An instance 362 of a software application 360 refers to a virtual machine 350 hosted on, or executing on, the data processing hardware 212 of the distributed system 200.

The host OS 220 can virtualize underlying host machine hardware and manage concurrent execution of a guest OS 354 on the one or more virtual machines 350. For example, the host OS 220 can manage the virtual machines 350a-n to include a simulated version of the underlying host machine hardware or a different computer architecture. The simulated version of the hardware associated with each virtual machine 350 is referred to as virtual hardware 352.

The virtual hardware 352 can include one or more virtual processors, such as virtual central processing units (vCPUs), emulating one or more physical processors 212 of a host machine 210. The virtual processors can be interchangeably referred to as a computing resource associated with the virtual machine 350. The computing resource can include a target computing resource level required for executing the corresponding individual service instance 362 of a software application 360.

The virtual hardware 352 can further include virtual memory in communication with the virtual processor and storing guest instructions, e.g., guest software, executable by the virtual processor for performing operations. For instance, the virtual processor may execute instructions from the virtual memory that cause the virtual processor to execute a corresponding individual service instance 362 of the software application 360. The individual service instance 362 can be referred to as a guest instance that cannot determine if it is being executed by the virtual hardware 352 or the physical host machine 210. The processors 212 of the host machine 210 can enable virtual hardware 352 to execute software instances 362 of applications 360 efficiently by allowing guest software instructions to be executed directly on the processor 212 of the host machine without requiring code-rewriting, recompilation, or instruction emulation. The virtual memory can be interchangeably referred to as a memory resource associated with the virtual machine 350. The memory resource can include a target memory resource level required for executing the corresponding individual service instance 362.

The virtual hardware 352 can further include at least one virtual storage device that provides run time capacity for the service on the host machine 210. The at least one virtual storage device may be referred to as a storage resource associated with the virtual machine 350. The storage resource may include a target storage resource level required for executing the corresponding individual service instance 362.

The guest OS 354 executing on each virtual machine 350 can include software that controls the execution of the corresponding individual service instance 362, e.g., one or more of 362a-n of the application 360 by the virtual machine 350. The guest OS 354a-n executing on a virtual machine 350a-n can be the same or different as other guest OSs executing on other virtual machines 350.

The guest software executing on each VM instance 350 may further assign network boundaries, e.g., allocate network addresses, through which respective guest software can communicate with other processes reachable through an internal network. The network boundaries may be referred to as a network resource associated with the VM instance 350.

In some implementations, a virtual machine 350 does not require a guest OS 354 in order to execute the individual service instance 362. The host OS 220 can further include virtual memory reserved for a kernel 226 of the host OS 220. The kernel 226 can include kernel extensions and device drivers to perform certain privileged operations that are off limits to processes running in a user process space of the host OS 220. Examples of privileged operations include access to different address spaces and access to special functional processor units in the host machine 210 such as memory management units. A communication process 224 running on the host OS 220 can provide a portion of virtual machine network communication functionality and can execute in the user process space or a kernel process space associated with the kernel 226.

According to implementations disclosed herein, the virtual machine manager 320 can create one or more new copies of a virtual machine 350 that preserve processing state, memory state, and local storage state, while the original virtual machine 350 continues to run. The virtual machine manager 320 can assign different attributes to the new copies to distinguish each copy from each other and the original virtual machine 350. The virtual machine manager 320 can include various application level hooks, such as APIs or meta-data entries, to copy a running instance 362 of the virtual machine 350.

Figure 3:
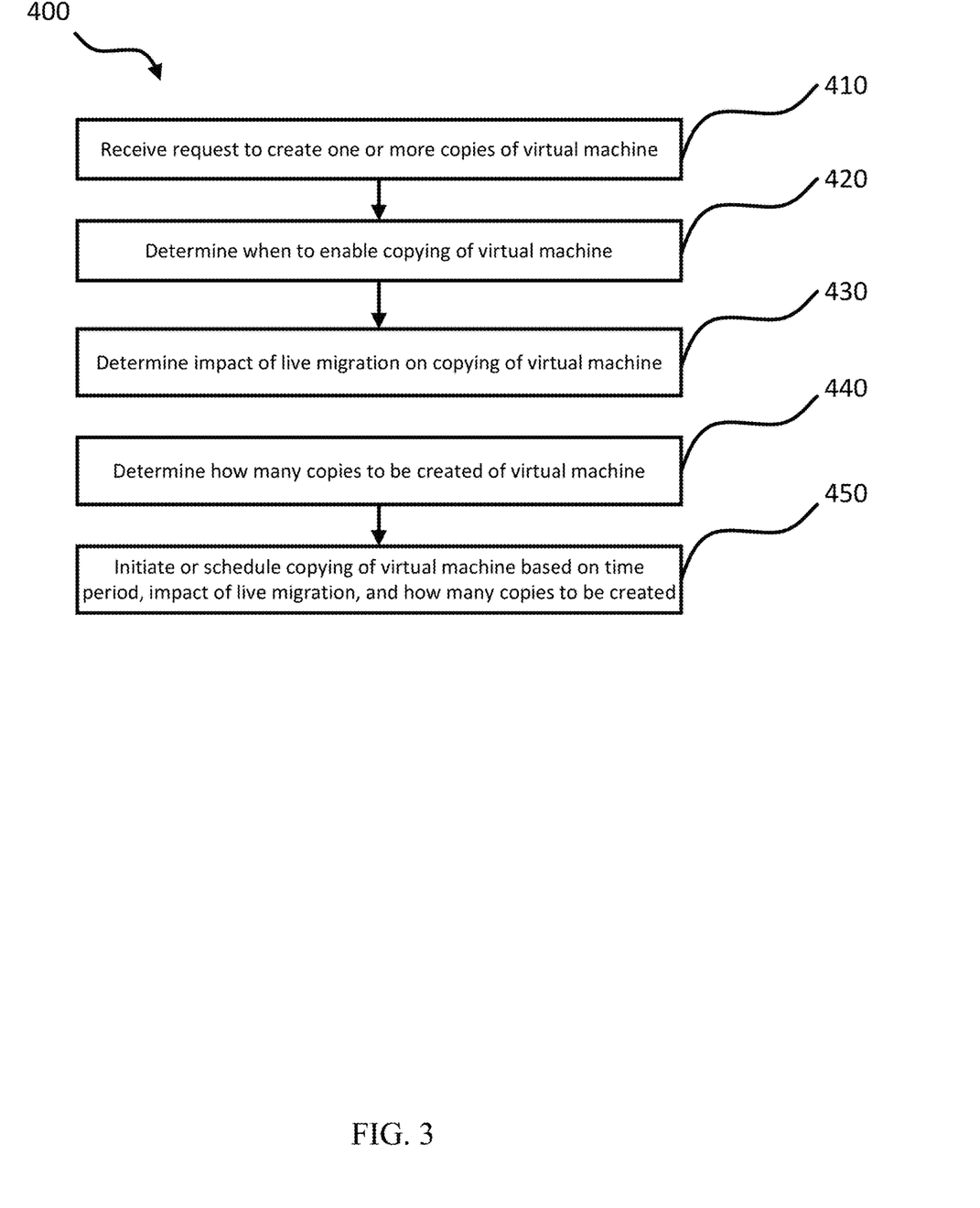
FIG. 3 depicts a flow diagram of an example process 400 for creating one or more new copies of a virtual machine according to aspects of the disclosure.

FIG. 3 depicts a flow diagram of an example process 400 for creating one or more new copies of a virtual machine. The example process 400 can be performed on a system of one or more processors in one or more locations, such as the distributed system 200 of FIG. 2.

As shown in block 410, the virtual machine manager 320 can receive a command or request to create one or more copies of a virtual machine 350 from a host machine 210. Referring back to FIG. 1, the commands or requests 170 can be sent by the computing devices 110 to a host machine 152 of the cloud computing systems 150 via the network 140. The host machine 152 can correspond to the host machine 210 of FIG. 2. Sending a command or request can enable a user to create one or more copies of the virtual machine 350 on demand.

As shown in block 420, upon receipt of the command or request, the virtual machine manager 320 can determine when to enable copying of the virtual machine. Since live migration can impact workloads of the computing devices 110, the virtual machine manager can determine a time period to copy the virtual machine 350 that lowers workload impact based on traffic usage. Traffic usage can include packets per second being processed or a number of current open network connections. Whether particular network connections are open can also be considered such as transmission control protocol (TCP) or user datagram protocol (UDP). Traffic usage can also include tracking an input/output (I/O) time to remote storage or local storage.

The virtual machine manager 320 can monitor traffic usage of the virtual machine 350 to determine a time period when traffic is below a threshold, for example, whether the number of packets per second being processed is below a threshold, the number of current open network connections are below a threshold, or an I/O time to storage is below a threshold. If traffic is below the threshold, the virtual machine manager 320 can start copying or schedule a future copying of the virtual machine 350 when the traffic can be below the threshold. If traffic is above the threshold, the virtual machine manager 320 can make copying unavailable or pause copying of the virtual machine 350. Copying of the virtual machine 350 can resume when the traffic is once again below the threshold.

The virtual machine manager 320 can also monitor whether particular network connections are open to start/resume copying or pause/schedule copying based on an application preference. For example, based on an application preference, the virtual machine manager 320 can start copying or schedule a future copying of the virtual machine 350 when a TCP connection is open and pause or make copying unavailable when a UDP connection is open. For an alternative application preference, the virtual machine manager 320 can start copying or schedule a future copying of the virtual machine 350 when a UDP connection is open and pause or make copying unavailable when a TCP connection is open.

As shown in block 430, the virtual machine manager 320 can further determine an impact of live migration on copying of the virtual machine 350 as workloads can experience a slowdown due to a brownout time and a pause due to a blackout time during migration. For example, the virtual machine manager 320 can consider a rate of memory copy as well as an amount of memory in the memory resources of the virtual hardware 352 to determine a length of a brownout time and/or blackout time. As another example, the virtual machine manager 320 can consider a rate of copy for a processing state, storage state, or any other states needed to resume execution on a copy virtual machine to determine the length of the blackout time.

As another example, if the memory state has converged such that it is possible to copy over all remaining memory that has not yet been updated on the copy virtual machine, then the migration can complete with a brownout or a blackout period. Otherwise, the migration can enter a post-copy state where, on the copy virtual machine, an attempt to access memory that is not yet copied will result in a brownout period where that memory is fetched over the network.

As yet another example, the virtual machine manager 320 can control a workload if determined that the workload cannot be paused for the blackout time. The virtual machine manager 320 can slow down a portion of activity in the workload to allow the workload to be paused for the blackout time. For instance, the virtual machine manager 320 can allow the workloads to complete critical processing before entering the blackout time, such as saving data to a disk or flushing existing memory.

The virtual machine manager 320 can place an upper bound on the length of the brownout time and/or blackout time of the migration. The virtual machine manager 320 can also determine the time period of block 420 based further on the length of the brownout and/or blackout time of the migration.

As shown in block 440, the virtual machine manager 320 can also determine a number of copies that can be created of the virtual machine 350. The number of possible copies can be based on the traffic usage as described in block 420, the amount of the memory in the memory resources, and/or the length of brownout and/or blackout time as described in block 430. The virtual machine manager 320 can also determine whether both the copy and original virtual machines should be active or only the copy virtual machine needs to be active. If both the copy and original virtual machines need to be active, the copy virtual machine can get new attributes to distinguish the copy and original virtual machines, such as but not limited to IP address, remote storage size or additional remote storage creation, e.g., persistent disk (PD) size or additional PD creation, identity and access management roles, keys/credentials, instance-name, or other processing, memory, or local storage states. For virtual machines accessing remote storage, a new remote storage can be created depending on the number of copies of the virtual machine and whether the application requests extra copies of a read/write. If only the copy virtual machine needs to be active, the attributes can remain as is.

The virtual machine manager 320 can further provide preferences around a time to live (TTL). For example, a TTL can be applied to either the original or new copies. The virtual machines can be copied but then the original and/or a portion of the new copies can be terminated after a period of time, such as after a post-copy brownout period, or when a predetermined number of copies have been created. Providing preferences around a TTL can be useful for a fail-over scenario or when only a fixed number of copies can be active at a given time.

The virtual machine manager 320 can consider trade-offs between the time to enable copying, impact of live migration, and the amount of copies to be created of the virtual machine 350. For example, the virtual machine manager 320 can consider tradeoffs between pre-copy and post-copy migration as well as processing pause time compared to fetching memory remotely. Trade-offs can differ depending on workload. The virtual machine manager 320 can decide a period of time that a workload can be paused and a choice between a longer brownout or blackout. A longer blackout can have more consistent performance, but a post-copy brownout could be preferable in other examples. The virtual machine manager 320 can intermediate between the underlying migration and the impact on the running workload, for instance, based on the factors described above with reference to blocks 420, 430, and 440.

The virtual machine manager 320 can further determine suggested or default options for migration based on historical workloads or user behavior. As an example, the suggested or default options can include an absolute default, such as stating a blackout time or brownout time must be less than a predetermined length for a website and/or for a database workload. For instance, the absolute defaults can be set as a blackout time of less than or equal to 500 ms for a website and a blackout time less than or equal to 50 ms and brownout time less than or equal to 100 ms for a database workload. As another example, the suggested or default options can include a scheduling default, such as to copy when a parameter is below a predetermined percentage threshold. For instance, the scheduling default can be set to copy when processing usage is 50% below a maximum or when a rate of memory change is 75% below a maximum. The scheduling default can also be set based on network traffic. For instance, the scheduling default can be set to copy when packets per second or an I/O to storage time is 50% below a maximum or less than a predetermined amount.

As shown in block 450, the virtual machine manager 320 can initiate or schedule creating one or more copies of a virtual machine based on one or more of the time period to enable copying, the impact of the live migration, or how many copies can be created of the virtual machine.

Figure 4:
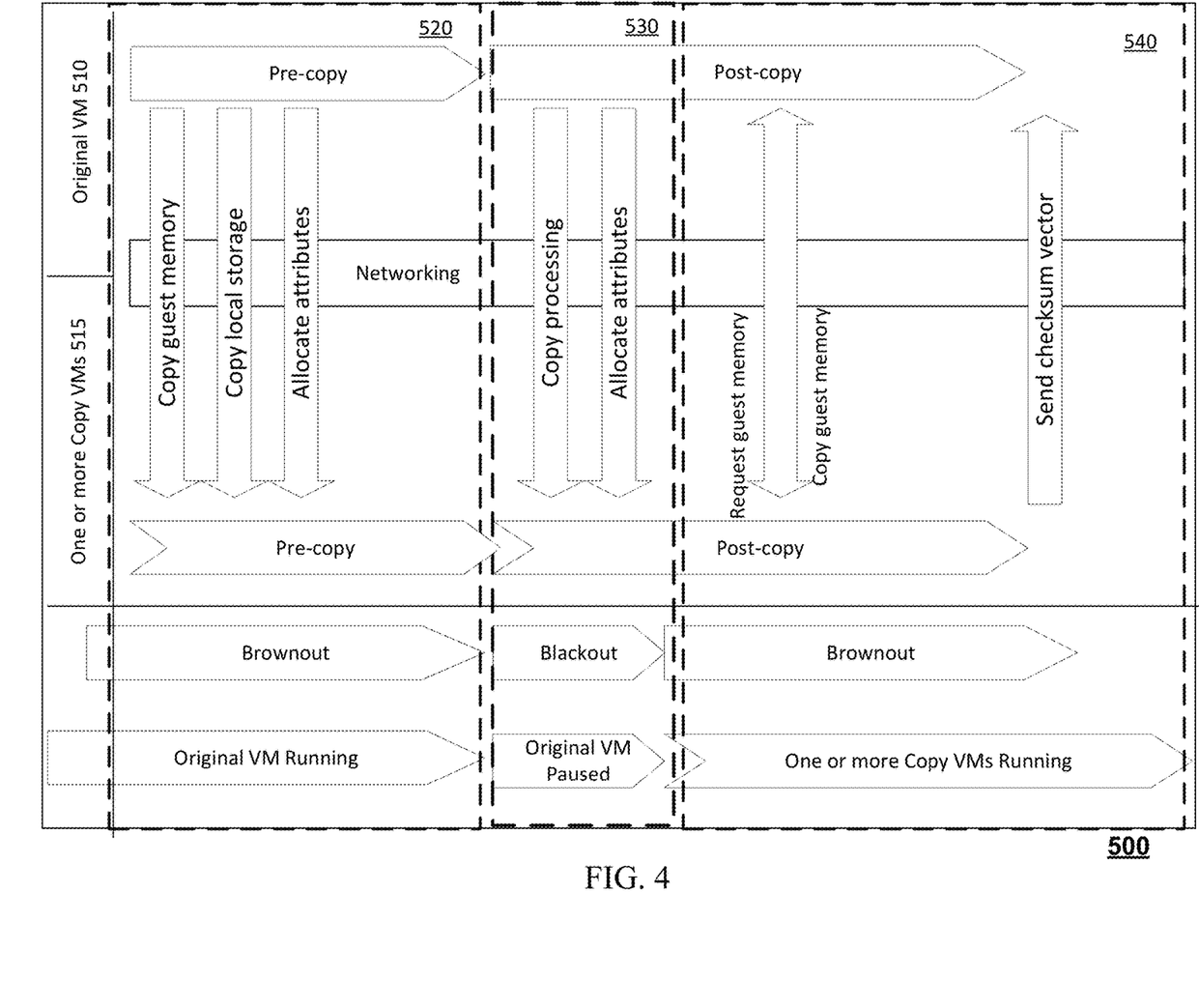
FIG. 4 depicts aspects of an example method to create one or more copies of an original virtual machine during live migration according to aspects of the disclosure.

FIG. 4 depicts aspects of an example method 500 where one or more copies of an original virtual machine are created during live migration. The original virtual machine can be a virtual machine from which memory, processing, and local storage are being copied and a copy virtual machine can be a virtual machine to which memory, processing, and local storage are being copied. In some examples, an original virtual machine can be associated with or operate on a particular physical machine, such as host machine 210. In some examples, the example method 500 can begin based on a request or command from a user, such as the example process 400 described above. The example method 500 can be performed on a system of one or more processors in one or more locations, such as the distributed system 200.

Depicted in FIG. 4 are an original virtual machine 510 and one or more copy virtual machines 515. The example method 500 can include operations which can be conceptualized within a pre-copy stage 520 and a post-copy stage 540. During pre-copy 520 and post-copy 540, the original virtual machine can enter a brownout period where the virtual machine continues operating even though copying is occurring. During these periods, guest execution can be slowed down by, for example, dirty tracking or post-copy network page-ins. During post-copy 540, the copy virtual machine can also enter a brownout period.

During the pre-copy stage 520, guest memory can be copied from the original virtual machine 510 to the one or more copy virtual machines 515. Guest memory can include memory which is created within a guest user space, or a guest user application. In some examples, guest memory can also refer to the underlying physical memory which corresponds with the particular virtual memory belonging to a particular guest user space or virtual machine instance.

During the pre-copy stage 520, the original virtual machine 510 can run on an associated physical machine. At this stage, one or more processors can copy guest memory to the one or more copy virtual machines 515. For example, memory content can be copied to a network buffer and sent over a network, e.g., internal network 160 of FIG. 1, via remote procedure call (RPC) protocols to the one or more copy virtual machines 515, where there can be corresponding RPC receiver threads on the one or more copy virtual machines 515 to receive and store the received guest memory into corresponding guest physical addresses. Data on local storage can also be copied to local storage of the one or more copy virtual machines 515.

During the process of migration from the original virtual machine 510 to the one or more copy virtual machines 515, certain pages of memory can be modified due to user processes or other processing which occurs on the original virtual machine 510. These differences can be tracked. Pages of memory which have been modified during the time in which guest memory is being transferred can be referred to as dirty pages. In some examples, only a subset of certain pages can be transferred during the pre-copy stage.

Guest memory can be read on the original virtual machine 510 and be written to guest memory of the one or more copy virtual machines 515. In some examples, the read and write processes can be performed through the use of the RPCs. In some examples, the RPCs can use pointers to particular memory content to identify one or more portions of physical or virtual memory to be copied from the original virtual machine 510 to the one or more copy virtual machines 515.

In some examples, bounce buffers can be used as part of the transfer. A bounce buffer can be a type of memory which resides in memory which is low enough architecturally for a processor to copy from and write data to. Pages can be allocated in a bounce buffer to organize memory. A virtual machine manager can repeatedly go through multiple passes of memory and through dirty pages as part of incrementally updating a dirty bitmap and copying dirty pages.

The pre-copy stage 520 can also include the generation of checksums. Checksums can be generated following the write of guest memory from the original virtual machine 510 to the one or more copy virtual machines 515. Checksums can be generated on both an original memory page and a related copy memory page to ensure that the transfer of that memory page occurred without error.

The pre-copy stage 520 can further include allocating distinguishing attributes to the one or more copy virtual machines 515 based on the number of copies being created or preferences around a TTL. As noted earlier, attributes to distinguish the copy and original virtual machines can include IP address, remote storage size or additional remote storage creation, identity and access management roles, keys/credentials, instance-name, or other processing, memory, or local storage states.

The example method 500 can further include a blackout stage 530. During the blackout stage 530, the original virtual machine 510 is paused so a user cannot operate or use the original virtual machine 510. A virtual machine manager can perform a pass through of the memory of the original virtual machine 510 to identify the last memory prior to the blackout and send a dirty bitmap to the one or more copy virtual machines 515.

A processing state of the original virtual machine 510 can also be copied to the one or more copy virtual machines 515. The processing state can include a CPU state, as an example. To copy the processing state, the virtual machine manager can expose a save/restore feature. The save can serialize the processing state, including device driver information and current I/O information, and the restore can copy the processing state to the copy virtual machine 515.

The blackout stage 530 can further include allocating the distinguishing attributes to the one or more copy virtual machines 515 based on the number of copies being created or preferences around a TTL. These distinguishing attributes can be in addition to or as an alternative to allocating during the pre-copy stage 520.

During the post-copy stage 540, enough information has been transferred from the original virtual machine 510 to the one or more copy virtual machines 515 that the one or more copy virtual machines 515 can run. The one or more copy virtual machines 515 can have different attributes from the original virtual machine 510, for example, if both the original and copy virtual machines are to continue running.

During the post-copy stage 540, a demand paging can be initialized with a final dirty bitmap. A control for demand paging can initialize a background fetcher module with the same dirty bitmap. Background fetching of memory pages which have not yet been fetched or migrated from the original virtual machine 510 can be accessed by the background fetcher module or the virtual machine manager. In some examples, on the one or more copy virtual machines 515, upon the requirement of a particular memory page which has not yet been transferred, remote memory access (RMA) or other PRCs can be used for the one or more copy virtual machines 515 to access memory pages not yet copied.

Upon receiving a memory page at the one or more copy virtual machines 515, a checksum can be generated to verify that the copying process occurred correctly.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for creating one or more copies of a virtual machine during live migration, comprising:
monitoring, with one or more processors, a data traffic usage, an amount of memory in a memory cache, and a rate of memory copy of the virtual machine;
determining, with the one or more processors, based on the monitored data traffic usage, a time period when the data traffic usage is below one or more data traffic usage thresholds to enable copying of the virtual machine during live migration;
determining, with the one or more processors, based on the monitored amount of memory in the memory cache and the monitored rate of memory copy, an impact of the live migration on the copying of the virtual machine, wherein determining the impact of the live migration comprises determining at least one of a length of brown out or black out time and determining the time period further comprises determining a time period when the length of the brown out or black out time is below an upper bound;
determining, with the one or more processors, based on the monitored data traffic usage and the determined impact of the live migration, an amount of copies that can be created of the virtual machine; and
initiating or scheduling, with the one or more processors, creation of the determined amount of copies of a running instance of the virtual machine at the determined time period.

2. The method of claim 1, further comprising receiving, with the one or more processors, a request to create one or more copies of the virtual machine.

3. The method of claim 1, wherein the one or more data traffic usage thresholds comprise at least one of amount of packets per second being processed, amount of current open network connections, or an input/output time to storage.

4. The method of claim 1, further comprising determining, with the one or more processors, the monitored data traffic usage is above the one or more data traffic usage thresholds during creation of the determined amount of copies of the virtual machine.

5. The method of claim 4, further comprising pausing, with the one or more processors, the creation of the determined amount of copies of the virtual machine until the monitored data traffic usage is below the one or more data traffic usage thresholds.

6. The method of claim 1, further comprising determining, with the one or more processors, that the virtual machine and one or more of the copies of the virtual machine are to be active.

7. The method of claim 6, wherein, in creating the determined amount of copies of the virtual machine, each of the copies of the virtual machine are provided with one or more attributes to distinguish each copy of the virtual machine with other copies of the virtual machine.

8. A system comprising:
one or more processors; and
one or more storage devices coupled to the one or more processors and storing instructions that, when executed by the one or more processors, causes the one or more processors to perform operations for creating one or more copies of a virtual machine during live migration, the operations comprising:
monitoring a data traffic usage, an amount of memory in a memory cache, and a rate of memory copy of the virtual machine;
determining, based on the monitored data traffic usage, a time period when the data traffic usage is below one or more data traffic usage thresholds to enable copying of the virtual machine during live migration;
determining, based on the monitored amount of memory in the memory cache and the monitored rate of memory copy, an impact of the live migration on the copying of the virtual machine, wherein determining the impact of the live migration comprises determining at least one of a length of brown out or black out time and determining the time period further comprises determining a time period when the length of the brown out or black out time is below an upper bound;

determining, based on the monitored data traffic usage and the determined impact of the live migration, an amount of copies that can be created of the virtual machine; and initiating or scheduling creation of the determined amount of copies of a running instance of the virtual machine at the determined time period.

9. The system of claim 8, wherein the operations further comprise receiving a request to create one or more copies of the virtual machine.

10. The system of claim 8, wherein the one or more data traffic usage thresholds comprise at least one of amount of packets per second being processed, amount of current open network connection, or an input/output time to storage.

11. The system of claim 8, wherein the operations further comprise determining the monitored data traffic usage is above the one or more data traffic usage thresholds during creation of the determined amount of copies of the virtual machine.

12. The system of claim 11, wherein the operations further comprise pausing the creation of the determined amount of copies of the virtual machine until the monitored data traffic usage is below the one or more data traffic usage thresholds.

13. The system of claim 8, wherein the operations further comprise determining that the virtual machine and one or more of the copies of the virtual machine are to be active.

14. The system of claim 13, wherein, in creating the determined amount of copies of the virtual machine, each of the copies of the virtual machine are provided with one or more attributes to distinguish each copy of the virtual machine with other copies of the virtual machine.

15. A non-transitory computer-readable medium for storing instructions that, when executed by one or more processors, causes the one or more processors to perform operations for creating one or more copies of a virtual machine during live migration, the operations comprising:

monitoring a data traffic usage, an amount of memory in a memory cache, and a rate of memory copy of the virtual machine;

determining, based on the monitored data traffic usage, a time period when the data traffic usage is below one or more data traffic usage thresholds to enable copying of the virtual machine during live migration;

determining, based on the monitored amount of memory in the memory cache and the monitored rate of memory copy, an impact of the live migration on the copying of the virtual machine, wherein determining the impact of the live migration comprises determining at least one of a length of brown out or black out time and determining the time period further comprises determining a time period when the length of the brown out or black out time is below an upper bound;

determining, based on the monitored data traffic usage and the determined impact of the live migration, an amount of copies that can be created of the virtual machine; and initiating or scheduling creation of the determined amount of copies of a running instance of the virtual machine at the determined time period.

16. The non-transitory computer-readable medium of claim 15, wherein:

the operations further comprise determining that the virtual machine and one or more of the copies of the virtual machine are to be active; and in creating the determined amount of copies of the virtual machine, each of the copies of the virtual machine are provided with one or more attributes to distinguish each copy of the virtual machine with other copies of the virtual machine.

* * * * *